Dec. 5, 1967

J. F. PTACEK ET AL 3,356,992

OPTICAL DETECTION AND COMPARISON APPARATUS
FOR CURRENCY CHANGING MACHINE

Filed Nov. 4, 1963

James F. Ptacek
Jerry W. Howard
Elmer Bradley Offutt
Robert E. Patterson
INVENTORS.

BY

Hovey, Schmidt, Johnson & Hovey
ATTORNEYS.

James F. Ptacek
Jerry W. Howard
Elmer Bradley Offutt
Robert E. Patterson
INVENTORS.

BY

ATTORNEYS.

Dec. 5, 1967  J. F. PTACEK ET AL  3,356,992
OPTICAL DETECTION AND COMPARISON APPARATUS
FOR CURRENCY CHANGING MACHINE
Filed Nov. 4, 1963  6 Sheets-Sheet 4

James F. Ptacek,
Jerry W. Howard
Elmer Bradley Offutt
Robert E. Patterson
INVENTORS.

BY
Hovey, Schmidt, Johnson & Hovey
ATTORNEYS.

United States Patent Office 3,356,992
Patented Dec. 5, 1967

3,356,992
OPTICAL DETECTION AND COMPARISON APPARATUS FOR CURRENCY CHANGING MACHINE
James F. Ptacek, Independence, Jerry W. Howard, Kansas City, Elmer Bradley Offutt, Independence, and Robert E. Patterson, Kansas City, Mo., assignors to The Vendo Company, Kansas City, Mo., a corporation of Missouri
Filed Nov. 4, 1963, Ser. No. 321,263
7 Claims. (Cl. 340—149)

ABSTRACT OF THE DISCLOSURE

Currency is tested for genuineness and proper denomination by directing light rays to selected portions of the surface of a bill under test. A light chopper converts the reflected rays from the various portions into a single light beam composed of multiple light bursts, each of said bursts being a sample of the radiation reflected from a corresponding portion. The composite beam impinges upon a photosensitive element, the latter effecting conversion of the beam into a plurality of electrical signals which are then routed to respective electrically responsive peak detectors. A rotary switching device is synchronized with the light chopper so that each detector at all times responds to the reflected radiation from a particular portion of the bill under test.

The electrical signals produced by the photosensitive element are adjusted in amplitude prior to delivery to the respective detectors in order that a genuine bill will be represented by equal detected amplitudes. The output of each detector is fed to a comparator which also receives an input sawtooth wave form, the comparator output being produced in response to equal voltages at its inputs. Thus, time coincident comparator outputs are produced in response to the sawtooth wave form and the detector outputs if the detected signals possess the aforesaid amplitude equality, and noncoincident comparator outputs, indicative of nongenuineness, are otherwise produced because of the time-varying amplitude of the sawtooth wave form.

This invention relates generally to apparatus for testing a document in which portions thereof each have a characteristic response to a particular type of transmitted energy incident thereon to determine if the document is genuine to discriminate between genuine documents of different denominations, and, more specifically, to apparatus for testing the genuineness and denomination of paper currency by measuring the intensity of light rays reflected from the surface thereof.

At the outset it should be understood that the instant invention finds particular utility when employed as a part of a currency-changing machine. The basic function of such currency changers is to receive and examine a dollar bill or other currency and, if the currency is determined to be genuine and of a particular denomination, to then pay out an amount of change equal in value to that of the received currency. Simultaneously, the currency is conveyed by the machine to a storage receptacle which may be periodically unloaded by the owner of the machine.

The basic need for currency changers arises from the demands of the vending machine art wherein it is desired to provide apparatus that will break down coinage and currency of relatively large denominations into smaller coinage for use in the operation of vending machines. Therefore, the currency changer is commonly placed adjacent a group of vending machines so that use of the machines will be encouraged.

Heretofore, various types of apparatus have been employed that will accept genuine coinage but reject coinage which is unfit for negotiation for one reason or the other. The presence of counterfeit coinage and bills is, of course, one primary reason for the necessity of providing suitable rejecting mechanism. Although coin rejectors have been in existence for some period of time, bill-changing apparatus is relatively new and yet presents many problems in the design and construction of testing and rejecting mechanism. Alternatively, the currency changer may become a component of a vending machine, in which case it will be arranged to pay back to the customer any difference between deposited currency and price of merchandise or services purchased.

It is, therefore, the primary object of this inventon to provide improved means of testing the genuineness of paper currency. More specifically, an important object of this invention is to provide apparatus for subjecting such currency to transmitted energy of a particular type and for measuring the response of the currency to this energy in order to determine the genuineness thereof.

Another important object of this invention is to provide apparatus for testing a document in which portions thereof each have a characteristic response to a particular type of transmitted energy; such apparatus being employed to direct the energy to the document, to measure the intensity of the energy after incidence thereof with the document, and to then compare the response of the various portions of the document to determine if the latter is genuine.

It is another object of this invention to provide document-testing apparatus for directing light rays to several portions of the document under test and for measuring and comparing the intensity of the rays reflected from such portions of the document by means sensitive to ratios of light reflection intensities between the different portions of the document rather than determination of simple individual magnitudes of light reflectances from the various areas.

Another object of this invention is to provide apparatus for handling multiple channels of intelligence-defining energy in order that a single means may be employed, common to all channels, for converting the energy into an electrical signal of corresponding intelligence-defining value.

Still another object of this invention is to provide electrical apparatus in cooperation with a synchronous switching device for sequentially directing multiple channels of intelligence-defining energy to a transducer responsive thereto for producing a corresponding plurality of intelligence-defining, electrical output signals and then for routing each signal to a corresponding electrically responsive structure in a predetermined sequence.

Yet another object of this invention is to provide apparatus for converting a plurality of incoming, spaced beams of light into a single beam composed of multiple light bursts, each of said bursts being a segment of a corresponding one of said incoming beams, such conversion being effected in order that the intelligence defined by each of the incoming beams, respectively, may be subsequently converted into an electrical signal of corresponding intelligence-defining value through the use of a single transducer rather than a separate transducer for each beam, thereby assuring that variations in the signals so produced will be caused by beam variation as against variables of operation introduced by the use of such separate transducers.

Other objects will become apparent as the detailed description proceeds.

MECHANICAL COMPONENTS OF THE CURRENCY TEST STATION

Before the currency-testing mechanism and its associated electronics are dealt with in detail, the apparatus for transporting the paper currency to a test position and for accepting the currency if it is deemed genuine will be described.

Referring to FIGS. 1, 2, and 11–14, the numeral 20 denotes the front wall or panel of a housing 21 containing the test station apparatus to be described hereinafter. The components of the apparatus within the housing 21 (shown broken away) are mounted either on, or within, a case or support 22. A shelf 24 is integral with case 22 and extends outside of the housing 21 through front panel 20.

A tray 26 is slidably received by shelf 24 for reciprocal movement between the normal position shown in the drawings and a position within the housing to be described in detail hereinafter. Tray 26 is recessed at 28 to receive paper currency and is provided with a currency holder 30. Holder 30 is hingedly mounted along its rear edge 32 for swinging movement about a horizontal axis. Tab 34 integral with holder 30 presents a handle for manual upward swinging movement of the holder 30 to permit placement of a bill in recess 28, whereupon the holder may then be returned to the normal bill-retaining position thereof.

Support or case 22 has mounted thereon a prime mover (electric motor and gear unit) 36 provided with a vertically extending output shaft 38. A crank arm 40 is rigid with the upper end of shaft 38 and is connected by a pin 41 to a link 42. The end of link 42 remote from crank arm 40 is pivotally attached to a pair of spaced, converging extensions 44 integral with the rearward edge 46 of tray 26.

It should be understood at this juncture that operation of prime mover 36 rotates shaft 38 to, in turn, move tray 26 from the position shown to a location within the housing where edge 46 engages the actuator button 48 of a tray-in switch 50. During this operation and subsequent return of the tray to the position shown, crank arm 40 makes one complete revolution with shaft 38, while the link 42 pivots about pin 41 and its connection with the converging extensions 44.

Approximately centrally located in the apparatus is a platform 52 which forms a part of currency-testing mechanism generally designated 54. Platform 52 is positioned so as to underlie recess 28 in tray 26 when the latter is moved within the housing by prime mover 36. Although the description and operation of mechanism 54 will be fully discussed later in this specification, attention is directed to the three light directors 56, 58 and 60 which serve to transmit light to the surface of the currency in the tray and receive reflected light rays from the surface for utilization by the tester to determine the genuineness of the currency. An electric motor 62 forming a part of tester mechanism 54 may also be seen in FIG. 1 disposed adjacent platform 52. A reflector 64 is shown mounted on the side of case 22, the reflector housing an incandescent lamp (shown schematically at 255 in FIG. 15) which serves as the light source for tester 54.

The other primary component of the mechanical apparatus mounted on top of the casing or support 22 is a currency-removal and gate assembly 90. Assembly 90 is mounted on the opposite side of support 22 from reflector 64 and is employed to remove currency from the recess 28 in tray 26 after the genuineness of the currency has been ascertained by tester mechanism 54 and its associated electronics.

Power for assembly 90 is supplied by accept motor 92 which has an output shaft 93 operably coupled with a shaft 94 by belt and pulley assembly 95. A U-shaped mount 96 is attached to the side of case 22 and presents a pair of pedestals 98 to facilitate the mounting of assembly 90 on the case. Shaft 94 is journaled in pedestals 98 and spans the distance therebetween.

Pulley structure 100 is disposed between pedestals 98 in surrounding and fixed relationship to shaft 94. This is clearly revealed in FIG. 12. A boom 102 is mounted on shaft 94 for swinging movement thereabout and extends laterally outwardly therefrom. Boom 102 carries a pin 104 upon which is mounted a roller 106. Four bands 108 are received by annular grooves in roller 106 and pulley structure 100, it being evident that such bands are trained around the structure and the roller to drive the latter upon energization of motor 92.

A U-shaped extension 110 is integral with boom 102 and extends laterally outwardly away from the apparatus. Leg 111 of extension 110 is pivotally joined with a link 112. This interconnection is formed by a stud 113 extending from leg 111 and received by a longitudinal slot (not shown) in link 112. A spring 115 joins stud 113 with the upper extremity 117 of link 112. Stud 113 is biased toward extremity 117 under the action of spring 115. Below stud 113 a forked member 114 is attached to link 112 and extends laterally therefrom toward pulley structure 100. Fork 114 receives a pin 116, the latter being attached to one leg of a U-shaped gate 118. Gate 118 is swingable about shaft 94 and underlies extension 110.

Figures 2, 9, 10:
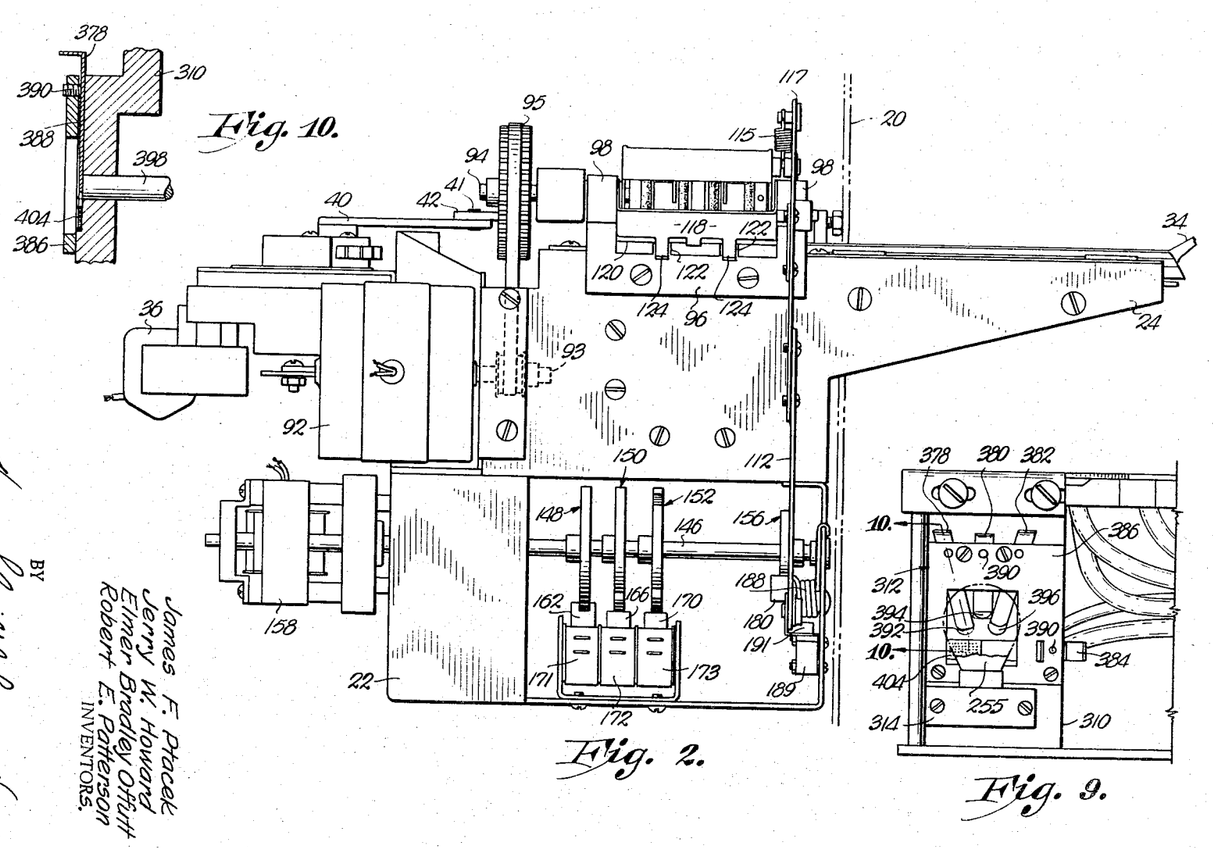
FIG. 2 is a side elevational view of the apparatus shown in FIG. 1.
FIG. 9 is a fragmentary, side elevational view of the testing mechanism showing the light source and its associated shutters.
FIG. 10 is a sectional view taken along line 10—10 of FIG. 9 with the light rod there shown revealed in elevation for clarity.

The bight of U-shaped mount 96 presents a horizontal ledge 120 which extends toward the viewer in FIG. 2. Ledge 120 has a pair of grooves 122 therein which receives tabs 124 integral with gate 118. A protuberance 126 integral with gate 118 is disposed between tabs 124 and extends obliquely upwardly toward pulley structure 100.

It will be shown hereinafter that link 112 is biased downwardly into the position shown in the drawings. Through interconnection with assembly 90 by means of leg 111 and fork 114, link 112, in the position shown, maintains rubber roller 106 vertically spaced from the path of travel of tray 26 and holds gate 118 closed with the depending tabs 124 thereof received in grooves 122. Before proceeding further with this description, however, it should be understood that upward shifting of link 112 effects opening of gate 118 and downward movement of roller 106 so that the latter, in conjunction with mechanism to be described hereinafter, may engage currency disposed in recess 28 for the purpose of removing or extracting currency from recess 28 after such currency is determined to be genuine.

To assist in the currency-removing function of roller 106, pulley structure 100 is provided with a ring 132 also of rubber or the like. Ring 132 engages a roller 134 which is mounted on a rod 136 disposed between pedestals 98. A plate 138, forming a part of case 22, has a pair of leaf springs 140 mounted on the underside thereof. A pair of holes in the plate receive corresponding studs 142 which are attached to the ends of rod 136. Leaf springs 140, as is evident in FIG. 12, bear against the studs 142 forcing the same along with rod 136 upwardly. This places roller 134 in engagement with ring 132 to form a gripper for directing currency through gate 118 when the latter is open. It will be appreciated that the action of springs 140 permits yielding of roller 134 (movement of the roller away from ring 132) when paper currency passes between the roller and the ring.

A U-shaped wire 144 is also employed to assist in directing the currency through gate 118. The ends of the legs of the wire are bent into hooked configurations and are hooked around pulley structure 100. Wire 144 is thus free to swing when the same is contacted by currency passing between ring 132 and roller 134.

Additional structure mounted on top of case 22 includes a switch unit 128 and a switch unit 130. The operational states of the switch units are controlled by associated actuator arms 129 and 131, respectively. Actuator arms 129 and 131 ride on the surface of a cam 37 rigid with shaft 38. Cam 37 has a recessed flat 39, arm 129 being normally engaged with flat 39 while arm 131 is normally engaged with the circular portion of the periphery of cam 37. Switch units 128 and 130 control functions which will be dealt with in full hereinafter.

Within case 22 and beneath assembly 90, a shaft 146 is disposed having thereon four cams 148, 150, 152 and 156. Shaft 146 is operably coupled with an electric motor 158, the motor and the cams serving as the basis of a timing mechanism for co-ordinating the operation of the various components of the apparatus.

Figure 15:
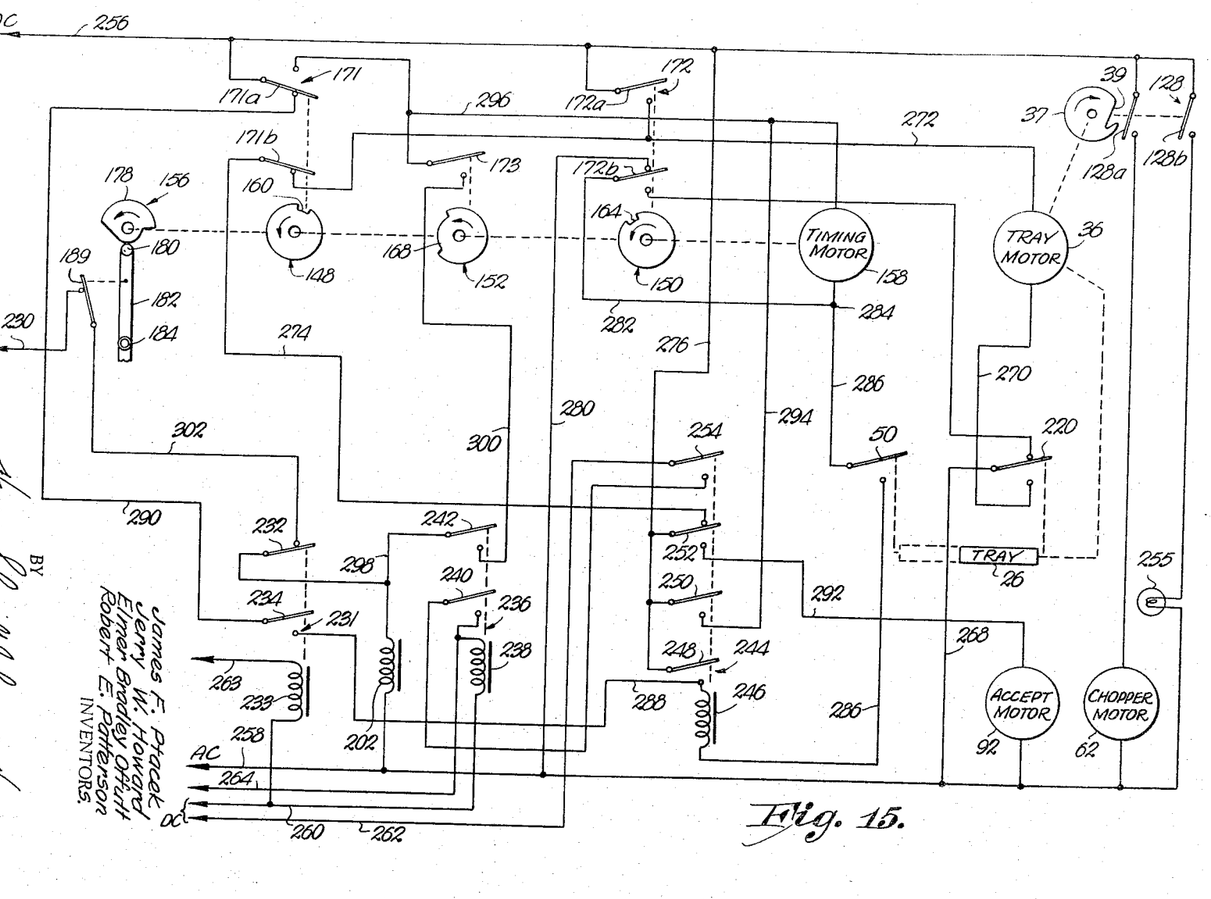
FIG. 15 is an electrical schematic diagram of the control circuitry of the instant invention.

The configurations of the various cams may be seen in FIG. 15 where such cams are shown in diagrammatic form. Note also that timing motor 158 is schematically illustrated in FIG. 15. By viewing FIGS. 2 and 15 collectively, it may be seen that cam 148 has a notch 160 therein which actuates a follower 162. Cam 150 has a notch 164 therein which actuates a follower 166. In like fashion, cam 152 is provided with a recessed surface 168 for controlling the operational state of follower 170. The various cams and their associated followers are shown in the drawings in their initial disposition when the apparatus is in stand-by.

Switch assemblies 171, 172 and 173 are mounted in operative association with followers 162, 166 and 170, respectively. The switches within assemblies 171–173 will be described fully hereinafter when the control circuitry of the apparatus is discussed.

Cam 156 is employed solely as a mechanical actuator to control the vertical shifting of link 112 which, in turn, moves roller 106 toward and away from the currency in tray 26. Cam 156 is provided with a raised portion 178 which engages a follower 180 upon rotation of shaft 146.

An arm 182 is pivotally mounted at 184 to case 22. One end of the arm is pivotally interconnected with link 112. The opposite end of the arm 182 carries follower 180 which is engaged by cam 156 during rotation of the cam. A spring 188 yieldably maintains arm 182 in the position shown in the drawings, it being evident that spring 188 also maintains links 112 in the position shown until rotation of cam 156 effects rotation of arm 182 about point 184 to thereby shift link 112 upwardly.

It may be noted that a switch 189 is mounted below arm 182 in disposition for actuation by an angle member 191 attached to the arm. When the components are in their normal positions shown, member 191 actuates switch 189 but moves out of engagement therewith upon shifting of the arm and link mechanism by cam 156. Switch 189 will be referred to hereinafter as the "gate switch"; its purpose and function will be discussed when the control circuitry is described hereinafter.

Figure 11:
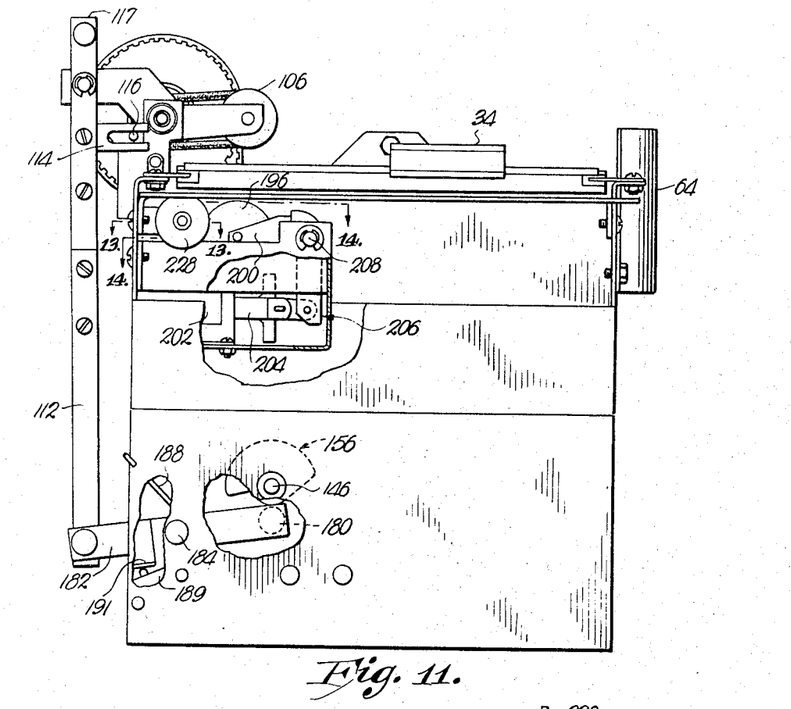
FIG. 11 is a front elevational view of the apparatus shown in FIG. 1.
Figure 12:
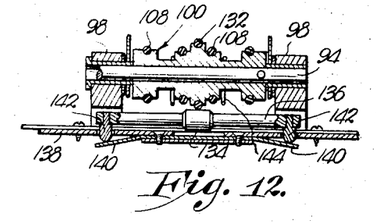
FIG. 12 is a fragmentary, sectional view taken along line 12—12 of FIG. 1.
Figure 14:
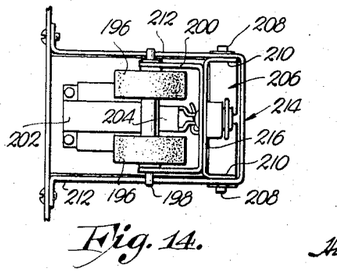
FIG. 14 is a detailed view taken along line 14—14 of FIG. 11.

In FIGS. 11 and 14 it may be seen that a pair of rollers 196 are disposed within case 22 beneath roller 106. Rollers 196 are mounted on a pin 198 which is carried by a U-shaped bracket 200. A solenoid 202 underlies rollers 196 and is provided with an armature 204. Armature 204 is connected with the bight of an upstanding, U-shaped element 206, element 206 being suspended within case 22 by a pair of studs 208 on corresponding legs 210 of element 206. Each stud 208 is disposed adjacent the free end of its leg 210 and is received by an opening in a wall 212 of a U-shaped mounting plate 214. The bight of bracket 200 spans the distance between the free ends of legs 210 and is connected thereto by a crosspiece 216 integral with legs 210. The force of gravity maintains rollers 196 in the position shown in the drawings with the ends of pin 198 resting upon corresponding walls 212.

Energization of solenoid 202 shifts armature 204 leftwardly as viewed in FIGS. 11 and 14 to swing bracket 200 and its rollers 196 in a clockwise direction (as viewed in FIG. 11) about studs 208. This raises rollers 196 and, since tray 26 is shifted to its position within the housing with edge 46 in contact with actuator button 48, rollers 196 extend upwardly through openings 218 in the recessed portion 28 of the tray.

Figure 13:
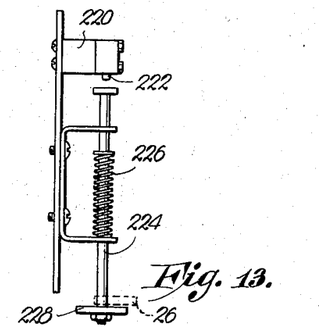
FIG. 13 is a detailed view taken along line 13—13 of FIG. 11.

Reference is now made particularly to FIGS. 11 and 13 wherein a tray-out switch 220 is shown having an actuator button 222. Switch 220 is disposed within case 22 adjacent rollers 196 and beneath assembly 90. In a manner to be described fully hereinafter, tray-out switch 220 effects energization of prime mover 36 to move tray 26 to its position within housing 21 upon release of the actuator button 222 for switch 220 so that the contacts thereof may close. As is apparent from FIG. 13, switch actuator rod 224 is normally biased into engagement with button 222 by spring 226 to maintain the contacts of switch 220 closed. However, actuator rod 224 has a disc 228 on the extremity thereof remote from switch 220 which is disposed to be engaged by tray 26 when the latter is in the normal outermost position thereof for maintaining rod 224 out of engagement with button 222 so that the contacts of switch 220 are maintained in an open position until tray 26 is manually pushed inwardly a sufficient distance to permit the rod 224 under the bias of spring 226 to shift button 222 and thereby change the condition of the contacts of switch 220.

CONTROL CIRCUITRY

The control circuitry for the apparatus is shown in FIG. 15. As noted heretofore in the description of the timing motor 158 and its associated cams, many of the mechanical components described above are shown diagrammatically in FIG. 15. Specifically, attention is now directed to the prime mover or tray motor 36 which is operably coupled with cam 37 and tray 26. Note also the electric motor ("chopper" motor) 62, the accept motor 92, solenoid 202 for actuating rollers 196, and the arm 182 operably associated with cam 156.

Switch unit 128 responsive to cam 37 comprises a pair of ganged, single-pole, single-throw switches 128a and 128b. Switch assembly 171 responsive to cam 148 comprises a single-pole, double-throw switch 171a and a single-pole, single-throw switch 171b. Switch assembly 173 responsive to cam 152 contains only a single-pole, single-throw switch. Switch assembly 172 responsive to cam 150 comprises a single-pole, single-throw switch 172a and a single-pole, double-throw switch 172b. The various switches and cams are shown in their stand-by positions prior to operation of the apparatus.

The gate switch 189 is a single-pole, single-throw switch and is shown in its stand-by position held in engagement with its contact by arm 182. It may be appreciated that rotation of cam 156 forces its raised portion 178 into contact with follower 180 to swing arm 182 about point 184 as described above. This, in turn, permits switch 189 to move to its open position under the influence of an internal spring (not shown) or other suitable means.

The function of gate switch 189 is to send an electrical command along line 230 to auxiliary apparatus (not shown) for the purpose of controlling such apparatus if currency is properly removed from the tray after testing. It will be seen, when the operation of the apparatus is set forth hereinafter, that gate switch 189 will remain open if currency, for one reason or another, becomes lodged in gate 181. It will be appreciated that such auxiliary apparatus in a currency changer will take the form of change mechanism operable to pay out the proper amount of change if the bill is deemed genuine.

Other components of the control circuitry not heretofore described include an OR relay 231 comprising a relay coil 233 and a pair of single-pole, single-throw switches 232 and 234; an accept or AND relay 236 comprising a relay coil 238 and a pair of single-pole, single-throw switches 240 and 242; a control relay 244 comprising a relay coil 246 and four single-pole switches 248, 250, 252 and 254 having contacts associated therewith in the manner as shown in FIG. 15; and an incandescent lamp 255 for use with tester mechanism 54 in a manner to be described hereinafter.

Electrical power for lamp 255 and the various motors and relays shown in FIG. 15 (except relays 232 and 236) is supplied by alternating current lines 256 and 258. Power for relay coils 233 and 238 of relays 231 and 236, respectively, is supplied by direct current lines 260 and 262, OR lead 263, and AND lead 264. The energizing signal from electronic circuitry to be described hereinafter for coil 233 appears across lead 263 and line 260; similarly, the energizing signal for coil 238 appears across lead 264 and line 260. DC line 262 is utilized by a holding circuit which will also be described hereinafter. It should be understood at this juncture that energization of OR relay coil 233 is effected in response to the presence of a sheet in tray 26, while energization of AND relay coil 238 is effected if the genuineness testing apparatus of the instant invention determines that the currency in the tray is valid.

It may be noted that tray-in switch 70 and tray-out switch 220 are shown associated with tray 26 and that, when these switches are in the stand-by position shown, the circuitry is dormant. In the description of the operation to follow it will be seen that actuation of tray-out switch 220, upon manual shifting of tray 26, initiates the control circuitry and hence the operation of the apparatus.

TEST STATION OPERATION

Before the electronic, genuineness-detecting structure is described, it is instructive to first understand the operation of the mechanical components of the apparatus under the influence of the control circuitry shown in FIG. 15.

As aforementioned, initiation of the apparatus is effected by manual shifting of tray 26, such as by pushing on tab 34, to move the tray a sufficient distance to actuate tray-out switch 220. Referring to FIG. 15, such actuation of switch 220 establishes the following electrical circuit: From line 258 to lead 268 and switch 220, along lead 270 to tray motor 36, along lead 272 to switch 171b, along lead 274 to switch 252, and then along lead 276 to AC line 256. The motor is thus energized and actuates crank arm 40 to shift tray 26 within the housing, shelf 24 serving as a guide for the tray. Prior to manual shifting of the tray to actuate tray-out switch 220, the operator of the apparatus places currency to be tested in recess 28. This is effected by raising and lowering holder 30 and slipping the paper currency under the holder into the recess, whereupon holder 30 in the lowered position then releasably maintains the currency in place in the recess.

Attention is directed to the OR relay 231. This relay operates in response to the presence of a sheet in recess 28 of tray 26. The means for actuating relay 231 will be fully described in the next section of this specification, it being sufficient at this juncture to understand that the presence of paper currency in the tray causes relay coil 233 to be energized by current flowing along lead 263 and line 260. Such energization, of course, causes switches 232 and 234 to open and close, respectively.

Tray motor 36 moves the tray within the housing until edge 46 of the tray strikes the actuator button 48 of tray-in switch 50. This establishes the following electrical circuit: From AC line 258 along lead 280 to switch 172b, along lead 282 to junction point 284, along lead 286 through the now closed tray-in switch 50 to relay coil 246, along lead 288 to the now closed switch 234, along lead 290 to switch 171a, and hence through switch 171a to AC line 256. Relay coil 246 is thus energized and switch 252 is moved into engagement with its lower contact. This breaks the power circuit to tray motor 36 and halts the movement of the tray.

At this point in the operation of the apparatus the currency in the tray is in the test position. Energization of relay 244 effects operation of accept motor 92 and timing motor 158 to execute the testing function. The power circuit for motor 92 is as follows: Along AC line 258 to motor 92, along lead 292 to switch 252, and then along lead 276 to line 256. The circuit initiating the operation of timing motor 158 is as follows: From line 256 along lead 276 to the now closed switch 250, along lead 294 to motor 158, through junction point 284 and along lead 282 to switch 172b, and then along lead 280 to AC line 258.

Operation of motor 92 drives roller 106. Simultaneously, energization of the timing motor rotates cam 156 to move link 112 upwardly, thereby opening gate 118 and swinging roller 106 into slightly spaced relationship with the currency in recess 28. Roller 106 will overlie openings 218.

Cam 148 is the first to actuate its switch assembly 171. When follower 162 moves out of notch 160, the switches 171a and 171b with shift, switch 171a then engaging its upper contact while switch 171b opens. Switch 171a in cooperation with lead 296, serves as a holding circuit for timing motor 158. Switch 171b assures that the tray motor 36 will remain deenergized until it is desired to return the tray to the stand-by position. This is done since line interruptions or manual pulling on the tray could re-energize the tray motor before the necessary control functions have been completed.

It may be appreciated that energization of tray motor 36 also effects rotation of cam 37 which, in turn, effects closure of switches 128a and 128b of switch unit 128 when actuator arm 129 is forced out of contact with flat 39. It is evident from FIG. 1 that only a few degrees of rotation of cam 37 is necessary in order to place arm 128 in contact with the circular portion of the cam periphery. Therefore, the chopper motor 62 and the lamp 255 connected in series with switches 128a and 128b, respectively, are energized shortly after tray motor 36 commences operation.

The energization of motor 62 and lamp 255 is necessary to the initiation of the testing function of tester mechanism 54. At this juncture it need only be understood that, if the currency is determined to be genuine, control lead 264 will effect energization of relay coil 238. Assuming that the bill is valid and that coil 238 is energized, cam 152 will then initiate bill removal when its recess 168 becomes aligned with follower 170. This establishes the following electrical circuit: From AC line 258 to solenoid 202, along lead 298 to the now closed switch 242, along lead 300 to the now closed switch 173, and hence along lead 296 through switch 171a to line 256.

Energization of solenoid 202 effects upward movement of rollers 196 and the currency is thus gripped between these rollers and the rotating roller 106. Rotation of roller 106 is in a clockwise direction as viewed in FIG. 11; therefore, the bill is pulled out from under holder 30 and advanced toward gate 118. Gate 118 was earlier opened by fork 114 when link 112 was shifted upwardly. The bill is thus permitted to pass through the gate and is directed into a suitable receptacle (not shown) which, in currency changers, may take the form of a cash box. It may be recalled that the structure illustrated in FIG. 12 effects positive directing of the currency through the gate.

At this stage of the operation of the apparatus, cam 156 has rotated approximately ¾ of a turn. Portion 178 of the cam is thus expended and arm 182 returns to its normal position under the influence of spring 188. This closes gate 181 and returns gate switch 189 to the position shown. Also, switches 232 and 234 return to their normal positions shown since currency is no longer in the tray. This creates the following electrical circuit: From AC line 256 to switch 171a, along lead 296 to switch 173, along lead 300 to switch 142, along lead 298 to switch 232, and hence along lead 302 to gate switch 189 and line 230. Since switch 173 will remain closed a short time after cam 156 closes gate 118, line 230 will be momentarily coupled with line 256 to place an AC signal on line 230 to command auxiliary apparatus (not shown) to function in response to passage of the currency through the gate. As aforementioned, such auxiliary apparatus may be a change pay-out mechanism when the instant invention is employed in a currency changer.

It should be understood that line 230 will be momentarily energized only if the bill successfully passes through the gate since, if the bill becomes lodged therein, gate switch 189 will remain open. If the bill becomes lodged in the gate, it will be trapped between the tabs 124 on the gate 118 and ledge 120. The gate will thus remain partially open since tabs 124 will be prevented from seating in corresponding grooves 122. Therefore, link 112 will be unable to return to its lowermost position; thus, angle member 191 on arm 182 will be unable to reengage switch 189 to close the latter. Manifestly, such lodging of the bill would require servicing of the unit by maintenance personnel prior to additional use thereof.

The signal from the electronic detection circuitry will only last a relatively short period of time sufficient in length to pull in relay 236. Therefore, a holding circuit through switch 240 of relay 236 and switch 254 of relay 244 is employed to maintain coil 238 energized. A feature of this arrangement lies in the fact that relay coil 246 must be maintained energized in order for relay coil 238 to remain energized. Thus, if tray-in switch 50 is deactivated by manual pulling on tray 26, relay coil 246 will become de-energized and the apparatus will no longer be able to pay out change.

The operational states of the various components of the apparatus commence reversion to normal when notch 164 in cam 150 comes into alignment with follower 166. Movement of switch 172b into engagement with its lower contact breaks the power circuit to timing motor 158 and de-energizes relay coil 246. Simultaneously, closure of switch 172a establishes a power circuit for tray motor 36 by connecting the upper lead 272 from the motor with line 256. Motor 36 thus returns tray 26 to its stand-by position outside of housing 21.

As the tray approaches its normal position, tray-out switch 220 moves to its normal position shown and re-energizes timer motor 158. This is effected by a circuit through the now closed switch 172b. Timer motor 158 then operates until notch 160 in cam 148 returns to alignment with its follower 162. This opens the holding circuit to the timing motor since switch 171a is returned to its normal position. All of the components of the circuitry have now reverted to their normal states.

THE CURRENCY TESTER

Attention is directed particularly to FIGS. 3–10 and 16 where the currency-testing apparatus of the present invention is shown in detail. It should be understood at the outset that the tester, in its entirety, comprises mechanism 54 referred to earlier in this specification along with the electronic apparatus illustrated in block diagram and schematic form in FIG. 16. The various components of the tester apparatus will now be described.

Figure 3:
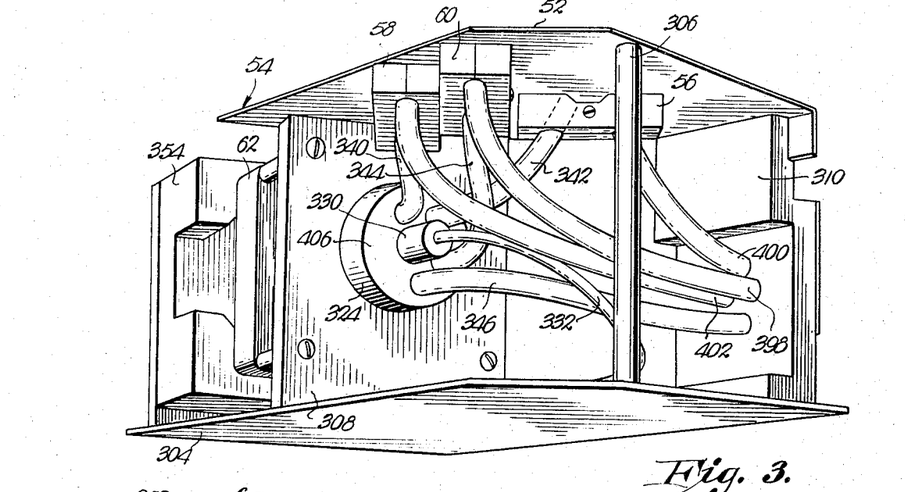
FIG. 3 is a perspective view of the currency-testing mechanism showing the light-conveying rods, the test platform, the prism drum and transducer assembly, and the synchronous switching device.

In FIG. 3 it may be seen that the platform 52 of mechanism 54 is spaced from and supported by a base 304. A column 306 and a pair of mounting plates 308 and 310 interconnect platform 52 and base 304. Chopper motor 62 is mounted on plate 308, plate 310 being employed as a support for a shutter assembly 312 and the mounting base 314 of lamp 255. Plate 310 and the structure mounted thereon is best revealed in FIG. 9.

Motor 62 is provided with an output shaft 316. A drum 318 is rigidly secured to one end of shaft 316 by means of a setscrew 320. Drum 318 extends into an opening 322 in plate 308. A collar 324 is received by opening 322 and is rigidly attached to plate 308.

Figures 1, 8:
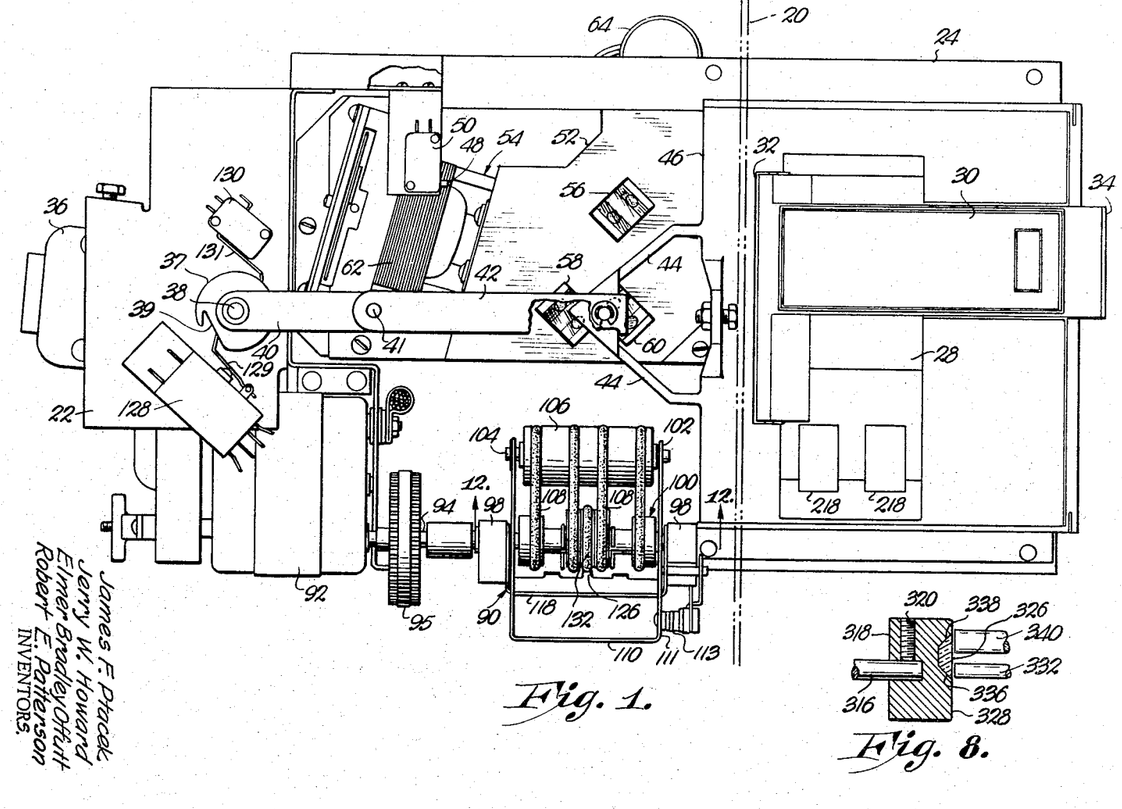
FIGURE 1 is a top plan view of the apparatus of the instant invention showing the currency-receiving tray, the currency-testing mechanism, and the roller and gate assembly for removing currency from the tray after testing thereof if the currency is determined to be valid.
FIG. 8 is a fragmentary, diagrammatic cross-sectional view of the prism drum, the prism, and associated structure.
Figures 5, 7:
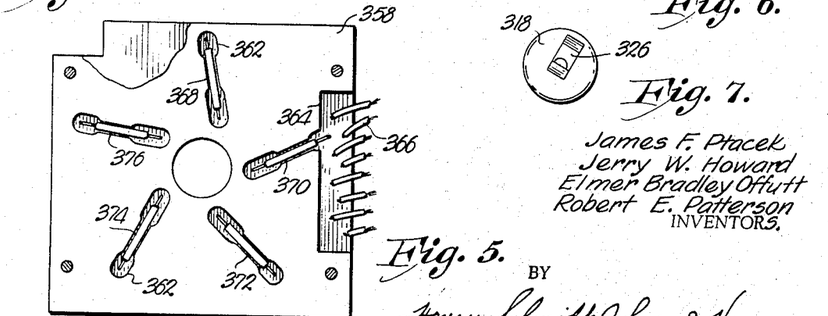
FIG. 5 is a fragmentary, elevational view looking oppositely from the direction of the FIG. 4 view and showing the magnetic reed switches.
FIG. 7 is a detailed view taken along line 7—7 of FIG. 6.
Figure 6:
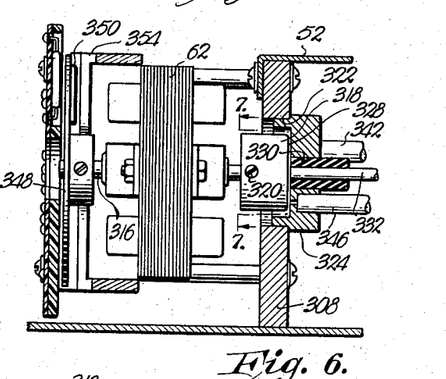
FIG. 6 is a sectional view taken along line 6—6 of FIG. 4 with the chopper motor, magnet-carrying disc, and prism drum shown in elevation for clarity.

Particularly in FIGS. 6–8, it may be seen that a prism 326 is fitted into a conjugate recess in face 328 of drum 318. Drum 318 is disposed on shaft 316 with the face 328 thereof in closely spaced relationship to the interior face of collar 324. A central opening in collar 324 receives a plug 330 containing a cable 332 which houses a phototransistor in the end of the cable within plug 330. (The phototransistor is shown schematically at 334 in FIG. 16.)

The optical axis of the phototransistor within plug 330 is aligned with the axis of rotation of shaft 316. Furthermore, prism 326 is disposed in drum 318 so that one of the 45° reflecting surfaces 336 thereof is centered on these aligned axes. This is clearly revealed in the partially diagrammatic view of FIG. 8. Prism 326 has another 45° reflecting surface 338 radially spaced from the axis of shaft 316 and sequentially movable in a manner to be described hereinafter to positions in alignment with four light-conveying, methyl methacrylate rods 340, 342, 344 and 346.

A disc 348 is rigidly mounted on the other end of shaft 316 and is provided with a permanent bar magnet 350 embedded therein. Magnet 350 extends generally radially of disc 348 and is spaced from the axis of rotation of shaft 316.

Figure 4:
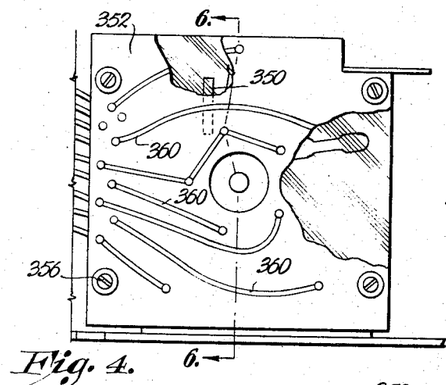
FIG. 4 is a rear elevational view of the currency-testing mechanism showing the printed circuit board with portions thereof broken away to reveal one of the magnetic reed switches and the rotating switching magnet.

A printed circuit board 352 is secured to a mounting block 354 rigid with the frame of motor 62. Four screws 356 secure board 352 to block 354, there being an insulated spacer sheet 358 sandwiched between the board and the block. The side of board 352 facing away from motor 62 is provided with a number of printed circuit conductors 360 as shown in FIG. 4. In FIG. 5, portions of the side of board 352 facing motor 62 may be seen through a plurality of slots 362 and a rectangular cutout 364 in spacer sheet 358. Cutout 364 is provided to facilitate the attachment of a plurality of electrical leads 366 to the circuit board 352.

Five magnetic reed switches 368, 370, 372, 374 and 376 are mounted on the side of board 352 shown in FIG. 5 and are received by corresponding slots 362 in spacer sheet 358. Only the capsules for the reed switches 368–376 are shown in the drawings, it being understood that contained within each of said capsules is a normally open, magnetically responsive switch of the type that will close when subjected to a magnetic field. Each of the reed switches 368–376 is so arranged as to be in alignment with magnet 350 for operation by the latter when the magnet is moved into juxtaposition therewith. Also, it should be noted that the switches are equally spaced from one another with respect to the circular path which will be described by magnet 350 upon rotation of disc 348 by motor 62.

Referring now to FIGS. 3, 9 and 10, it may be seen that the shutter assembly 312 comprises four leaves or shutters 378, 380, 382 and 384 which are longitudinally shiftable in channels cut in plate 310, such channels forming passageways for the shutters by the attachment of a rectangular frame 386 to the exterior face of plate 310. This construction is revealed in FIG. 10 wherein shutter 378 is shown slidably received by passageway 388. Setscrews 390 are employed to hold corresponding shutters in the desired positions.

Three openings 392, 394 and 396 through plate 310 permit light to pass from lamp 255 to three light-conveying, methyl methacrylate rods 398, 400 and 402, respectively. The ends of the rods 398, 400 and 402 adjacent plate 310 are registered with corresponding openings 392, 394 and 396, the other ends of these rods being received by light directors 60, 56 and 58, respectively. In this manner, light is directed from source 255 to the surface of the bill in tray 26 when the latter moves the bill to its test position within housing 21. In this regard, it should be understood that the bill-receiving recess 28 in tray 26 is provided with three apertures (not shown) which are aligned with directors 56, 58 and 60 to permit the light to strike the surface of the bill and reflect therefrom during testing.

Light rods 340, 342 and 344 extend from collar 324 to light directors 58, 56 and 60 respectively, and serve to convey the light reflected from the surface of the bill to prism 326 in a manner to be fully described hereinafter. Shutters 378, 380 and 382 are employed to control the amount of light entering rods 398, 400 and 402 and hence, the amount of light that will be reflected from the surface of the bill.

Attention is directed to light rod 346 which is received at one end thereof by an opening in collar 324 and at the other end thereof by an opening (not shown) in plate 310. This rod conveys light directly from lamp 255 to prism 326, the amount of light allowed to enter the rod being controlled by shutter 384 which overlies a screen 404. Light emanating from lamp 255 passes through that portion of screen 404 which is aligned with the corresponding end of rod 346 and uncovered by shutter 384.

It should be understood that the ends of rods 340, 342, 344 and 346 which terminate in collar 324 form a circular pattern except for the blank portion 406 of collar 324. In other words, adjacent rods are angularly spaced approximately 72° from one another with the exception of rods 340 and 346 which are spaced-apart by an angle of approximately 144°. Furthermore, the axes of the rods at the ends thereof disposed in collar 324 are parallel with the axis of rotation of shaft 316 and equidistant therefrom; therefore, as illustrated in FIG. 8, the reflecting surface 338 of prism 326 will be sequentially centered on these axes during rotation of drum 318.

Disc 348 and drum 318 are mounted on shaft 316 so that the magnet 350 carried by the disc, and the prism 326 carried by the drum, will perform their control functions in unison upon energization of motor 62. In the drawings, magnet 350 is proximal to switch 368 and is subjecting the switch to its magnetic field. Meanwhile, prism 326 is disposed to direct light rays carried by rod 342 to the phototransistor housed in cable 332 within plug 330. The result is that an electrical signal will appear in cable 332, such signal being routed by way of appropriate leads 366 and conductors 360 to switch 368 for coupling with external circuitry to be described hereinafter. It is evident, therefore, that each 72° of rotation of shaft 316 closes one of the magnetic reed switches and directs one of the light channels to the phototransistor. The one exception to this is when the prism is aligned with the blank portion 406 of collar 324, whereupon the corresponding reed switch 374 will be closed, but little or not light will be incident with the phototransistor. Note that the direction of rotation of shaft 316 is clockwise as viewed in FIG. 4; the next reed switch to be closed upon continued rotation of shaft 316 is switch 376, then switch 374, etc.

Figure 16:
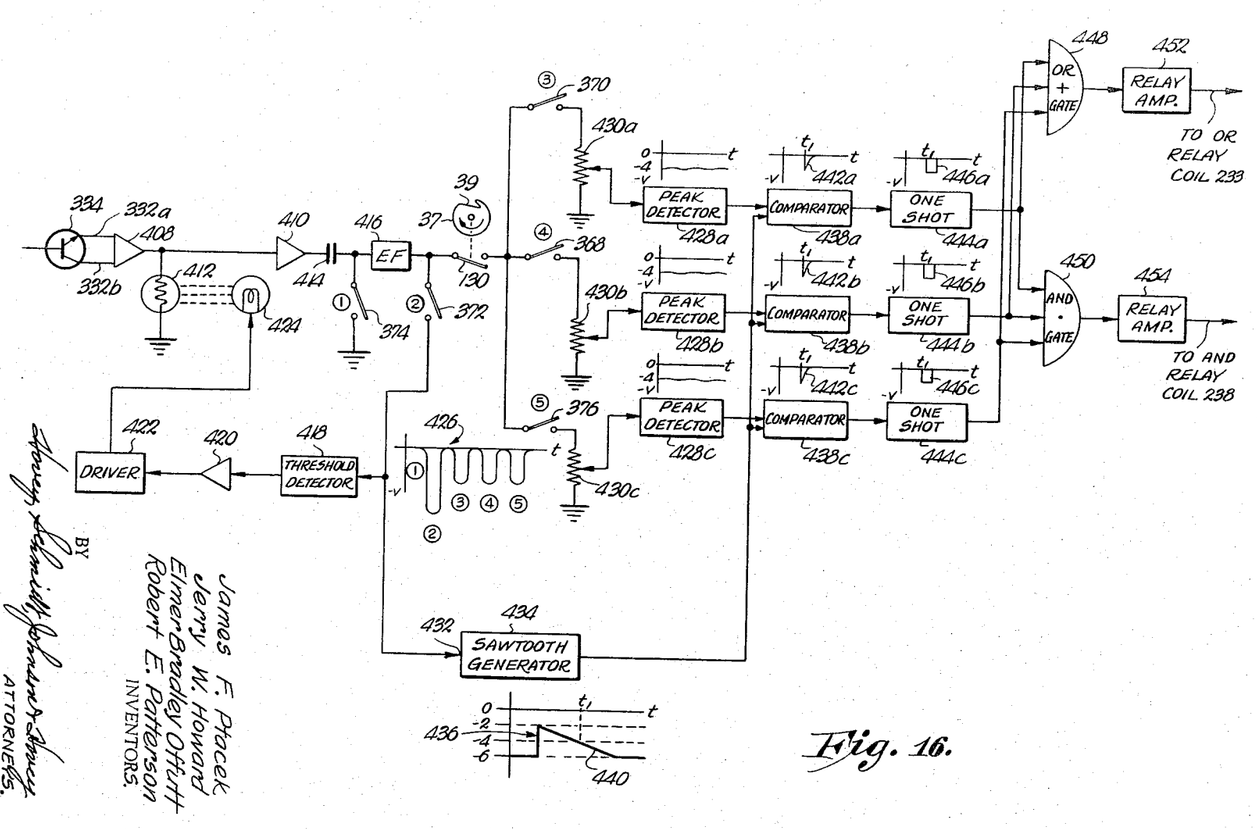
FIG. 16 is a diagram showing the electronics that cooperate with the currency-testing mechanism of the instant invention to produce an output signal if the currency under test has characteristic properties indicative of genuineness.

Reference is now made to FIG. 16 wherein the electronics of the tester apparatus are shown. Attention is directed to the schematic representation of the reed switches 368–376, the order of operation thereof during rotation of shaft 316 being indicated by the numerals 1–5 enclosed in circles. The illustrative voltage wave form diagrams in FIG. 16 show the use of a negative supply voltage; this is done since it is contemplated that solid state electronics employing PNP type transistors will be utilized in practicing the invention. Those skilled in the art will appreciate, however, the substitution of NPN transistors will produce equivalent results with a mere reversal of the voltage polarity.

The phototransistor 334 forms the input to the circuitry of FIG. 16. The output of the phototransistor is fed to a voltage amplifier 408. The interconnection between the phototransistor output and the input of amplifier 408 is effected by cable 332 shown in FIG. 3 and illustrated in FIG. 16 by leads 332a and 332b. It should be understood, therefore, that the leads in cable 332 form no part of the leads 366 connected to the printed circuited board 352. Transistor 334 is a silicon phototransistor or, alternatively, a photoelectric cell may be employed.

A second stage of amplification 410 follows amplifier 408, the output of the latter also being coupled with a cadmium sulfide cell 412. Cell 412 has a resistance dependent upon the intensity of the light to which the cell is subjected and, therefore, is employed in shunt with the output of amplifier 408 to control the level of the output signals therefrom in a manner to be fully described hereinafter.

The output of amplifier 410 is coupled by a capacitor 414 to an emitter follower or buffer stage 416. Capacitor 414 serves as a DC blocker and also clamps the output of amplifier 410 when reed switch 374 is closed. Closure of switch 374 grounds the output of amplifier 410 and charges capacitor 414 to effect the clamping operation for purposes that will become evident as this specification proceeds; at this juncture it should be understood that closure of switch 374 corresponds to the positioning of the prism 326 in alignment with the blank portion 406 of collar 324. The emitter follower stage 416 serves to present a fixed, high impedance load to capacitor 414 at all times (except when switch 374 is closed) regardless of the particular reed switch that is closed at a given instant.

The output of emitter follower 416 is coupled by way of switch unit 130 with reed switches 370, 368 and 376. It will be remembered that switch unit 130 is responsive to cam 37 on shaft 38 of tray motor 36. In FIG. 1 it may be seen that the actuator arm 131 of switch unit 130 will not change the state of the switch unit until approximately one-half revolution of shaft 38. This one-half revolution of shaft 38 is required to bring tray 26 within the housing to the test position. Thus, the normally open switch of unit 130 will not close until the currency in the tray is in proper disposition for testing thereof, i.e., tray 26 within the housing with its edge 46 in contact with the actuator button 48 of tray-in switch 50.

The output of the emitter follower 416 is also coupled by way of reed switch 372 to threshold detector 418. Since the various reed switches are sequentially operated, it is evident that the emitter follower output will be coupled with threshold detector 418 only once during each cycle of operation of the reed switches. Closure of switch 372 corresponds to the positioning of prism 326 in alignment with rod 346 which couples the prism directly with the light source 255.

The threshold detector 418 is biased so as to respond only to input signals above a predetermined threshold voltage. Normally, the amplitude of the input pulse to the threshold detector will be slightly above the threshold voltage thereof so that an output signal will be produced by the detector. The output of detector 418 is amplified by an AC amplifier 420 and then fed to a driver stage 422. The driver is a combination DC amplifier and capacitively coupled Miller integrator. Thus, a DC output is produced by driver 422 that is proportional to the average value of the input signal from amplifier 420. This DC output is employed to drive an incandescent lamp 424 which is operably associated with cell 412. Since the resistance of the cell decreases as the intensity of the light incident thereon increases, pulses from emitter follower 416 of greater than normal level will increase the brilliance of lamp 424 and cause a corresponding decrease in the resistance of cell 412. This, in turn, shunts a greater portion of the output of amplifier 408 to ground to thereby return the amplitude of the emitter follower output to the desired level. Conversely, pulses from the emitter follower of less than normal amplitude will decrease the level of the output signal from the threshold detector and thereby increase the effective gain of amplifier 408. This "normal" pulse level from the emitter follower is preselected through adjustment of the shutter 384 associated with light source 255. In this manner, photocell drift, lamp aging, line voltage fluctuations or other disturbances that might effect the intensity of the light emanating from source 255, are compensated for as well as variations in the gain of the amplifier stages 408 and 410.

Graph 426 illustrates the output signals of emitter follower stage 416 during operation of the apparatus. The four pulses shown correspond in their order of occurrence to the signals appearing at reed switches 372, 370, 368 and 376, respectively. This correlation is indicated by the encircled numerals which accompany each pulse and corresponding switch. Note that no pulse occurs during the operation of switch 374 since, of course, no light can reach the phototransistor 344 since the prism 326 is aligned with the blank portion 406 at the time the switch 374 is actuated.

The next reed switches to close will be switches 370, 368 and 376 in that order. Each of these switches corresponds to a prism position in alignment with one of the rods that is conveying reflected light rays from the surface of the bill under test. Each of these three channels from the surface of the bill is handled by the circuitry in an identical fashion.

It is assumed for purposes of illustration, that the three areas of the bill under consideration have differing reflectivities but electrical pulses produced by the phototransistor and rotating prism have approximately equal relative amplitudes because of proper adjustment of the light control shutters and level controls 430a–430c. Thus, the pulses in graph 426 corresponding to the signals appearing at reed switches 370, 368 and 376 have approximately equal amplitudes but which are characteristic of the light-reflecting properties of the bill at the various portions thereof which are selected for reflecting the incident light rays from source 255.

Looking first at the signal appearing at reed switch 370, it may be seen in FIG. 16 that this signal is applied to the input of a peak detector 428a through a level control 430a. The level control may take the form of a voltage divider as shown. The pulse from the reed switch appearing at the input of the peak detector 428a is converted into a signal at the output of the peak detector having a nearly constant amplitude. This is indicated by the small graph accompanying the block representing the peak detector stage, such graph indicating that the output from peak detector 428a is approximately −4 volts. Peak detector circuitry of this type is conventional and well known in the art and employs capacitor-charging and discharging circuitry having a relatively short, charging time constant and a relatively long, discharging time constant. Fine control 430a is adjusted according to the amplitude of the input pulse to set the level of the peak detector output at −4 volts. It will be appreciated that the −4 voltage level is set forth for illustrative purposes only and may be set at any other value appropriate to the particular components being utilized in the circuitry.

At the time that reed switch 372 was closed, the electrical pulse conducted therethrough was fed to the input of the threshold detector 418 as aforesaid and also to the control input 432 of a sawtooth generator 434. Generator 434 produces a single pulse 436 each time the control input 432 thereof is triggered by a pulse from reed switch 372. Thus, one pulse 436 is produced during each cycle of operation of the reed switches. Sawtooth generators of this type are well known and widely used in the art; therefore, further description thereof in this specification is unnecessary.

Referring again to the operation of the circuitry at the time that reed switch 370 is closed, it may be seen that the outputs from the peak detector 428a and from the sawtooth generator 434 are coupled with a voltage comparator 438a. Comparator 438a is a differential input voltage comparator that triggers when the negative-going ramp 440 of pulse 436 is approximately equal to −4 volts. This occurs at time $t_1$ as illustrated by the trigger pulse 442a appearing on the graph accompanying the block representing comparator 438a. In other words, comparator 438a produces trigger pulse 442a at its output at the time $t_1$ corresponding to substantial equality of the voltage levels of the two input signals thereto.

A monostable multivibrator or "one shot" 444a is coupled with the output of comparator 438a and produces an output pulse 446 at time $t_1$. It may thus be appreciated that the over-all effect of sawtooth generator 434, peak detector 428a, comparator 438a, and one shot 444a is to produce an output pulse 446a of predetermined width at the time when the outputs of both the sawtooth generator and the peak detector are approximately equal in voltage level. The width of pulse 446a may be controlled by the parameters of the multivibrator circuitry.

Since the circuitry following each of the reed switches 370, 368 and 376 is identical, peak detector 428b, comparator 438b and one shot 444b operate on the pulse appearing at reed switch 368 in the same manner as described above for reed switch 370. The same is true for peak detector 428c, comparator 438c, and one shot 444c coupled with reed switch 376, it being noted that sawtooth generator 434 is coupled with one of the inputs of each of the comparators 438a–438c.

The outputs from the three one shots are fed to both a 3-input OR gate 448 and a 3-input AND gate 450. The output of OR gate 448 is amplified by a relay amplifier 452 to raise the output thereof to a sufficient level for energization of OR relay 231. Likewise, the output from AND gate 450 is amplified by a relay amplifier 454 for use in energizing AND relay 236.

OVER-ALL SYSTEM OPERATION

The operation of the system as a whole may now be visualized. Although the various apparatuses comprising the composite bill-handling and testing system have heretofore been described in terms of their use and application with paper currency, it is instructive at this juncture to note that the system is equally operable with any document having characteristic light-reflecting properties indicative of genuineness.

To continue further, in the case of United States paper currency, different portions of either side of a particular bill are capable of reflecting light rays incident thereon to a greater or lesser degree. On the green ink imprinted side of a one dollar bill there are areas that are completely void of either lettering or design, while still other areas vary from a light to a deep green. Thus, in counterfeit bills, while an effort is made to imitate a valid bill, differences inevitably exist due to the type of paper used, the particular ink employed, and variations in the counterfeit plate from the actual plates used in printing a genuine bill. Differences also exist between various denominations of bills as to the disposition of printed areas, the degree of printing on a specific portion of the bill, and the light-reflecting characteristics of selected areas.

Therefore, in the instant apparatus three areas are chosen for photometric measurements. The three light directors 56, 58 and 60 are disposed so as to direct and receive light from the three chosen areas. The three areas of the bill to be checked are arbitrarily chosen to give different degrees of reflectivity so that the test will be more accurate regardless of the condition of the currency being examined. However, the amplitudes of the pulses resulting from transduction of the reflected light from the test areas do not significantly vary in height, as shown in FIG. 16, because of selective variation of the amount of light permitted to pass onto the test areas through respective light tubes 398, 400 and 402. Control of the amount of light falling onto the test areas, and which results in approximately equal reflectances from test areas of varying reflectivity, is provided by adjustment of the shutters 378, 380 and 382 to correspond to the particular denomination being tested. In this manner, selected amounts of light are permitted to fall on the regions of the bill being checked and which vary from area to area undergoing check.

The adjustable shutters 378, 380 and 382 provide a rough adjustment, while fine adjustment is accomplished by suitable operation of the individual potentiometers 430a–430c.

When the testing of the bill is initiated by placing the same in tray 26 and pushing on tab 34, approximately one-half of a revolution of shaft 38 is required before the currency is placed in the test position. During this time the chopper motor 62 is permitted to reach its maximum speed and any transients appearing in the electronic circuitry are allowed to dissipate, since switch unit 128 is operated almost immediately after movement of tray 26 commences. Switch unit 130, however, prevents the output from emitter follower 416 from reaching the three reed switches 370, 368 and 376 until the currency reaches the test position. At this time, cam 37 closes switch 130 to thereby place the currency-testing apparatus in operation.

Paper currency in circulation presents a wide range of reflective surface conditions due to soil, abrasion, wrinkling, and fading or bleaching. The total effect may yield as much as a 40% variation in photometric data from a given measurement area on two consecutive, valid bills. However, the ratios between the reflectances of the tested portions of the surfaces of the bills tend to remain constant since a dirty, crumpled or worn bill is likely to be relatively uniform in such condition. Consequently, the outputs of the comparator stages tend to remain in sufficient coincidence to result in acceptance of valid currency regardless of its age or condition.

The optical scanning of chopping action of the rotating prism 326 converts the three channels of light rays from the surface of the bill under test into a single light beam composed of intermittent bursts of rays from these channels and from a light channel transmitted directly to the prism from source 255 by rod 346. This single beam of light created by the prism is, as discussed above, directed along the axis of rotation of chopper motor shaft 316 toward the phototransistor 334 which has its optical axis aligned therewith.

The commutating action of the rotating magnet 350 and the magnetic reed switches 368–376 then routes the various light channels to the appropriate portions of the electronic circuitry of FIG. 16. The disposition of the magnet-carrying disc 348 and the prism drum 318 on a common shaft (chopper motor shaft 316) enables the chopping and commutating functions to be synchronized so that the appropriate portions of the tester electronics always receive electrical signals responsive to the same light channel.

Looking first at the sequential operation of reed switches 370, 368 and 376, it may be seen from the voltage wave form graphs accompanying peak detectors 428a–428c that the outputs therefrom are all set at approximately −4 volts. This is done by appropriate adjustment of the shutters 378, 380 and 302, and of level controls 430a–430c.

The shutters 378, 380 and 382 and the level controls 430a–430c are adjusted to provide the aforementioned equalization of the peak detector outputs when a bill is being tested that has reflectivity characteristics that lie approximately midway in the tolerance range. It is significant that there can be relatively wide variations of the magnitudes of the peak detector outputs as long as the ratios between the magnitudes remain within relatively narrow limits. That is, if the magnitude of measured reflectance at one check point is near the upper or lower limit of the tolerance range at that point, then the magnitude of the reflectances at the other check points must be correspondingly near the upper or lower limits of the respective ranges. On the other hand, a simple "go, no-go" testing method would pass anything within the limits of the tolerance ranges even though one reflectance should be just above the lower limit and the reflectance at another point just below the upper limit.

Assuming that a bill is under test, the voltage output wave forms from the comparators and the one shots will be as shown in FIG. 16. The circuit parameters of the three one shots are set so as to provide output signals of equal widths. Thus, under the ideal conditions illustrated in FIG. 16, the output pulses 446a–446c from one shots 444a–444c are all initiated at time $t_1$ and are, therefore, coincident.

It is evident that these coextensive pulses will trigger AND gate 450 and cause an output signal to be produced therefrom. This signal is amplified by relay amplifier 454 and employed to energize the relay coil 238 of AND relay 236. It will be remembered from the discussion heretofore of the operation of the control circuitry of FIG. 15 that the energization of relay coil 236 commands the bill-handling apparatus to accept the bill and remove it from the tray. The energizing signal from relay amplifier 454 appears across AND lead 264 and DC line 260.

As bills having surfaces of different reflectivities are placed in the tray for testing, the voltage level of the outputs of the various peak detectors will vary accordingly. Since three different areas of the bill are being examined by the tester, it is evident that these different areas may vary from one another to thereby disturb the equality of the peak detector outputs. As this happens, the instant in time when the voltage level of a particular peak detector output equals the voltage level of the ramp 440 of the sawtooth generator pulse 436 will change. Thus, the net effect is to disturb the coincidence of the trigger pulses 442a–442c from the three comparators. Manifestly, the outputs from the three one shots will no longer be coincident.

As long as the pulses 446a–446c have a certain degree of time overlap, AND gate 450 will be triggered and the bill thereby accepted. Bill surface variations, however, will eventually reach a point where there is no period of time in which the three pulses from the one shots are co-existent. In other words, there will be no mutual overlapping of the three pulses and hence no output from AND gate 450. At this point of bill variation, the bill is deemed to be invalid by the tester and is not accepted.

Because of the inherent response time of AND gate 450, a certain amount of mutual overlap of the three pulses from the one shots will be required before the gate will be triggered. This overlap can be predetermined and the widths of the three pulses set accordingly for proper system response to bill variations.

The clamping action of capacitor 414 in cooperation with reed switch 374 may now be fully appreciated. The reference for the output signals emanating from amplifier 410 must be maintained at a constant value for each cycle of reed switch operation in order to insure that the levels of the peak detector outputs will not vary during operation of the tester except when bills of differing reflectivity characteristics are encountered. Thus, when the optical chopper is momentarily inoperative during alignment of prism 326 with the blank portion 406 of collar 324, capacitor 414 is charged by the closure of reed switch 374. This places the reference of the forthcoming output signals from amplifier 410 at zero volts.

It may also be seen that an additional reference is provided by the light channel transmitted directly from source 255. This occurs after the clamping action upon closure of reed switch 372 which applies a pulse of relatively high amplitude to the input of threshold detector 418. The threshold detector in cooperation with A.C. amplifier 420 and driver 422 executes an automatic gain control function to stabilize the output of amplifier 408 in a manner as described earlier in this specification. Again, variations in the levels of the peak detector outputs by means other than the bills under test are prevented.

The OR gate 448 shown in FIG. 16 is employed to control the energization of relay coil 233 of OR relay 231. It will be remembered that the OR relay must be energized only if a sheet of material is present in the tray. Therefore, the OR gate 448 and its associated relay amplifier 452 effect this function by providing an energizing signal for coil 233 only if one of the light channels is present in rods 340, 342 or 344 indicating the presence of sheet material in the tray. This energizing signal is coupled with coil 233 by OR lead 263 and DC line 260 in FIG. 15.

Having thus described the invention, what is claimed as new and desired to be secured by Letters Patent is:

1. Apparatus for testing a document in which portions thereof each have a characteristic response to radiant energy incident thereon to determine if the document is genuine or of a particular class, said apparatus including:
   means for producing and directing radiant energy onto each of said portions respectively of the document;
   means disposed to receive the radiant energy directed to each portion after incidence thereof with the corresponding portion;
   detecting means operably associated with said receiving means and responsive to the energy received thereby for producing first electrical signals, each having an amplitude of a magnitude dependent upon the intensity of said received energy from a corresponding portion;
   means coupled with said detecting means and responsive to said first signals for adjusting the amplitudes of at least certain of said first signals to provide all of the first signals with amplitudes which, if the document is genuine or of said class, are substantially equal;
   means for generating a second electrical signal having an amplitude which varies in one direction over a range of values including possible magnitudes of said first signals;
   comparator means operably coupled with said generating means and said adjusting means and responsive to the first signals therefrom and said second signal for producing third electrical signals, each of the latter having a predetermined duration and occurring in time when the amplitude of said second signal and the amplitude of a corresponding first signal from the adjusting means are substantially equal; and
   output means operably coupled with said comparator means and responsive to said third signals for producing an output signal when said third signals occur in an overlapping time relationship, whereby the output signal is produced if said portions of the document have said characteristic responses indicating that the document is genuine or of said class.

2. Apparatus as set forth in claim 1, wherein said second signal generating means is a sawtooth generator, said comparator means being operably associated with said generator for producing said third signals when the amplitudes of respective first signals from said adjusting means and the sawtooth have said substantial equality, whereby the time of occurrence of production of the third signals varies with the amplitude of respective first signals from the adjusting means.

3. The invention of claim 1, wherein said comparator means produces electrical pulses of a fixed width, each occurring when said amplitudes of the corresponding first signal from said adjusting means and the second signal have said substantial equality, said output means producing said output signal when said electrical pulses are coincident.

4. Apparatus for testing a document in which portions thereof have a characteristic response to light rays incident thereon, said apparatus including:
   a single source of said light rays;
   means operably associated with said source for simultaneously directing a part of the rays therefrom to each of said portions respectively of the document;
   transducer means disposed to receive the rays directed to each portion after incidence thereof with the corresponding portion, said transducer means being responsive to the rays received thereby for producing a plurality of electrical signals each having an amplitude dependent upon the intensity of the received rays from a corresponding portion;
   output means operably coupled with said transducer means and responsive to the signals therefrom for producing an output signal if the amplitudes of said signals are of predetermined levels, whereby the output signal is produced if said portions of the document have said characteristic responses to thereby indicate that the document is genuine or of a particular class, said transducer means having a transducer component and means for causing the latter to sequentially scan the rays directed to each portion of the document after incidence thereof with the document, a dark reference and light rays transmitted directly from said source, and including a common amplifier coupled to said component for receiving electrical signals produced therein and producing individual outputs corresponding to the input electrical signals, said amplifier being operable to produce said individual outputs in exact synchronism with the input signals received thereby; and
   automatic gain control means operably associated with said amplifier and responsive to the voltage difference between the signals produced by the component when scanning the dark reference and the direct light source respectively for automatically controlling the amplitude of said individual outputs to compensate for variations in the radiant energy output of said source.

5. The invention of claim 4, wherein is provided shutter means operably associated with said directing means for independently controlling the intensity of the rays directed to each of said portions.

6. The invention of claim 4, wherein said transducer means is disposed to receive said rays directed to each portion after reflection thereof by the corresponding portion.

7. The invention of claim 6, wherein said output means produces said output signal if the amplitudes of all of said plurality of signals are approximately equal.

References Cited

UNITED STATES PATENTS

| | | | |
|---|---|---|---|
| 3,031,076 | 4/1962 | De Claris et al. | 340—149 X |
| 3,211,268 | 10/1965 | Dills et al. | 340—149 X |
| 3,239,814 | 3/1966 | Willie | 340—149 |
| 3,246,297 | 4/1966 | Silverstein et al. | 340—149 |
| 3,256,984 | 6/1966 | Ptacek | 340—149 X |

THOMAS B. HABECKER, *Acting Primary Examiner.*

NEIL C. READ, *Examiner.*

H. I. PITTS, *Assistant Examiner.*